7591X
D. Williams.
Tailors' Measure.
No. Patented May 22. 1833
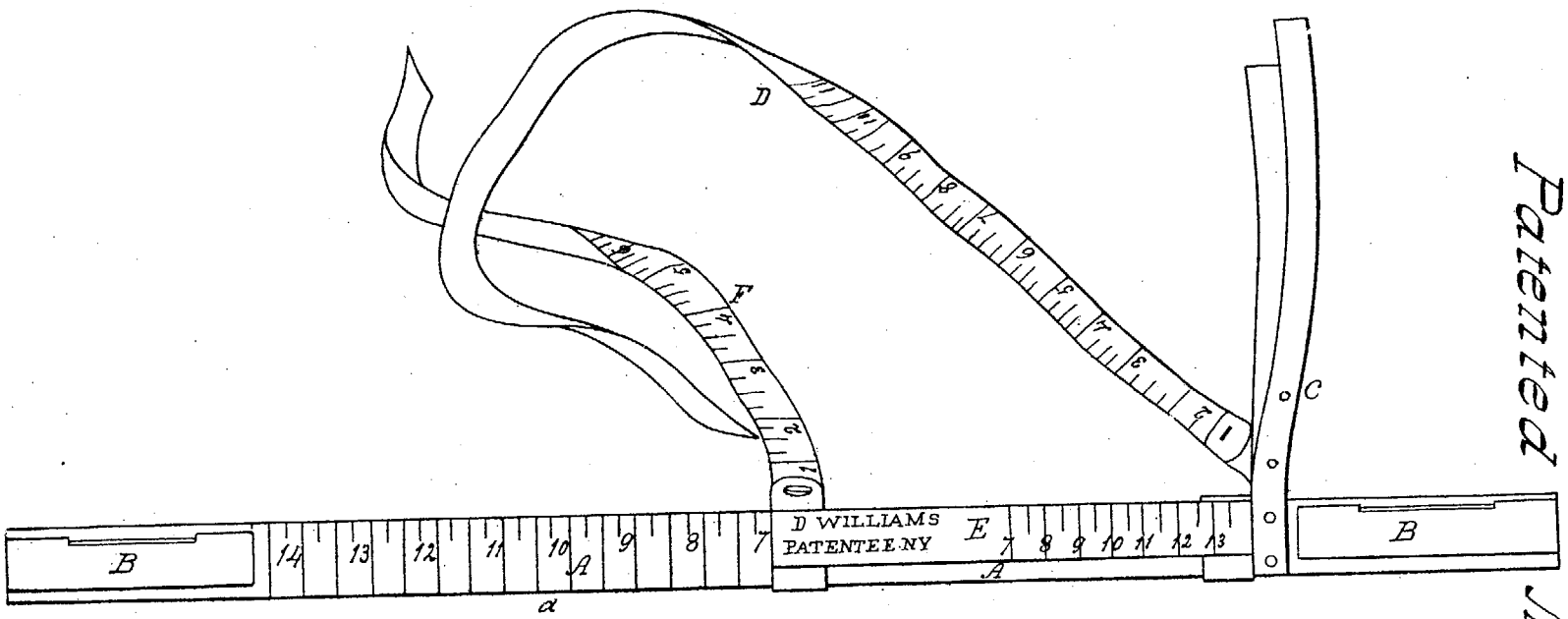

7591X

May 22. 1833

Daniel Williams of the City of New York.
Letters Patent (May 22. 1833. —

The Schedule referred to in these Letters Patent and making part of the
Same containing a description in the words of the Said Daniel Williams
himself in the art of Tailoring.

To all to whom these presents Shall come. Be it known that I Daniel
Williams of New York in the County of New York and State of New
York have invented a new and useful machine and improvement in
the art of Tailoring called the Mathematical Measurer and that the
following is a full and exact description of the construction and opera-
tion of the Said Machine as invented by me.
1st A piece of Spring Steel or other metal about twenty one inches
long more or less and about an inch and a quarter wide and forming
a Strap. 2d To each end of this Strap is attached a Spirit level
placed in a Small block of mahogany or other wood for the purpose of
adjusting the instrument when it is in use in a line exactly parallel
with the horizon. 3d A Stem or upright piece of metal attached to the
Strap near the right hand end and at right angles with its upper edge
to which is fastened a tape measure not less than eighteen inches long
4th The first described piece of metal or Strap is divided into inches and
half inches commencing at the upright Stem and proceeds to the
left. 5th A piece of brass about Seven inches long divided into half and
quarter inches with a band of the Same metal attached to each end of it
and made to Slide on the Steel Strap to the left hand end of which
is attached a tape measure not less than ten inches long.
The following is the mode of using the machine. First place the
Strap close under the right arm with the upright Stem close in front
of it taking great care that the coat on the customer be not in doubles
under or in front of the arm so as to prevent the machine from going
close to the body. Second. Adjust the level on the right hand side of
the Strap so that the bubble pass from end to end and let the customer
or place the thumb of his right hand on it to keep it in this position again

[illegible] 75791X the body. Third. Place the right hand under the lower edge of the Strap
and directly under the right arm with which the Strap is kept tight up to the
arm, and it is not to be removed until the level is adjusted on the other
end of the Steel and the four following measures are taken which must
be done with the left hand. — 1st Slide the brass on the Strap so that the
left hand end of it shall touch the back Seam of the coat on the customer
and the number of inches it reaches on the Strap is to be entered in the
measure book. This we shall call the cardinal measure.

2d The tape measure on the front end of the Strap is to be passed up
the shoulder to the prominent bone on the back part of the neck and place
the number of inches in the measure book. This we shall call the neck
measure. 3d Pass now the tape measure over the shoulder [illegible] the
Sleeve head and down to the Strap at the same figure on the brass that
was taken from the Strap, when the first or cardinal measure was ta-
ken or in other words the same as the figure on the Strap which the
end of the brass still touches. This we shall call the Shoulder measure.
4th The short tape measure attached to the brass is to be passed up the
back Seam to the bone before mentioned at the back part of the neck.
(This we ^shall^ call the back measure. 5th Pass the measure first used
across the breast to the front of the left arm. This we shall call the breast
measure. Fourth. Take the level on the right hand end of the Steel
in the right hand and hold it firmly against the breast of the customer
with the bubble floating the upper edge of the Steel being close under the
arm and the upright piece close to the front of it, as before; the measure
fastened to the Steel Stem will now be taken, and passed up on a straight
line with the edge of it holding it a little distance from the Steel.

Now the question is, where is the upper point of the fore part
of the Coat in relation to this line carried up in front of the arm.
Is it in front of the line or back of it? Or is it on a Straight line
with it. Whichever it is must be entered in your measure book giv-
ing of the quantity as near as possible if it be either in front or back of
the line.

Erd. [illegible]

W. Cruikes
A. McIntire
A. MacDonnell

Daniel Williams (Granted May 22. 1839) (868 Words)

[illegible]